United States Patent
Kim

[19]

[11] Patent Number: 6,128,693
[45] Date of Patent: Oct. 3, 2000

[54] BANK POINTER COMPARATOR AND ADDRESS GENERATOR FOR A DVD-ROM SYSTEM

[75] Inventor: Jeh Won Kim, Seoul, Rep. of Korea

[73] Assignee: Samsung Electronics Co., LTD, Rep. of Korea

[21] Appl. No.: 09/119,798

[22] Filed: Jul. 21, 1998

[30] Foreign Application Priority Data

Jul. 23, 1997 [KR] Rep. of Korea ................ 97-34560
Jun. 11, 1998 [KR] Rep. of Korea ................ 98-21764

[51] Int. Cl.⁷ ................................. G06F 12/00
[52] U.S. Cl. ............................................. 711/5
[58] Field of Search ................ 711/1, 5, 157, 711/217, 218, 219; 365/230.03, 230.04

[56] References Cited

U.S. PATENT DOCUMENTS

| | | | |
|---|---|---|---|
| 4,713,759 | 12/1987 | Yamagishi et al. | 711/5 |
| 5,557,766 | 9/1996 | Takiguichi et al. | 711/5 |
| 5,737,572 | 4/1998 | Nunziata | 711/157 |
| 5,751,988 | 5/1998 | Fujimura | 711/5 |
| 5,848,258 | 12/1998 | Fenwick et al. | 711/5 |
| 6,003,111 | 12/1999 | Holman et al. | 711/5 |
| 6,026,464 | 2/2000 | Cohen | 711/5 |

*Primary Examiner*—Eddie P. Chan
*Assistant Examiner*—Kevin Verbrugge
*Attorney, Agent, or Firm*—Samuels, Gauthier & Stevens LLP

[57] ABSTRACT

An data processing apparatus for a digital versatile disk ROM system includes an EFM demodulator, an error-correction decoder, and a data transfer unit, each of which is interfaced with an external memory partitioned into first, second, and third banks for storing demodulated data, error-corrected data and transfer data. A bank pointer comparator generates first, second, and third bank pointers, compares the bank pointers with each other, and activates or deactivates predetermined enable signals in accordance with comparison result. The bank pointers represent the bank of external memory in which EFM-demodulated data is written, the bank in which error-corrected data is stored, and the bank from which transfer data is read, respectively. Each bank pointer is incremented when an operation associated with the bank pointer is completed rather than the conventional technique of increasing the bank pointer whenever an ECC block sync signal is input. Thus, the data processor ensures that data is written, error-corrected, and read without loss, thereby increasing system data rate.

18 Claims, 7 Drawing Sheets

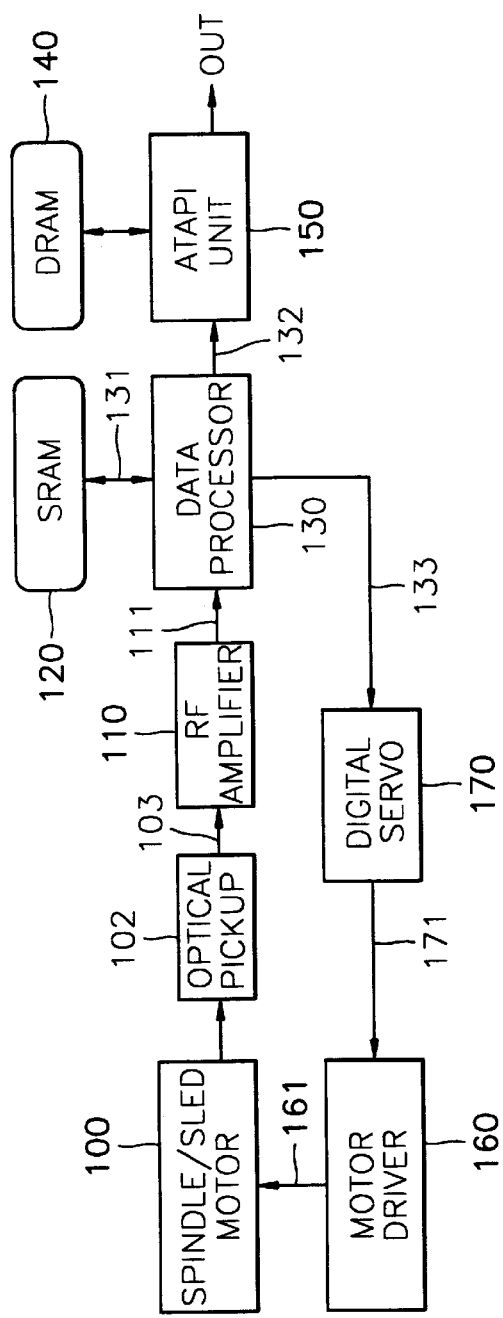
FIG. 1 (PRIOR ART)
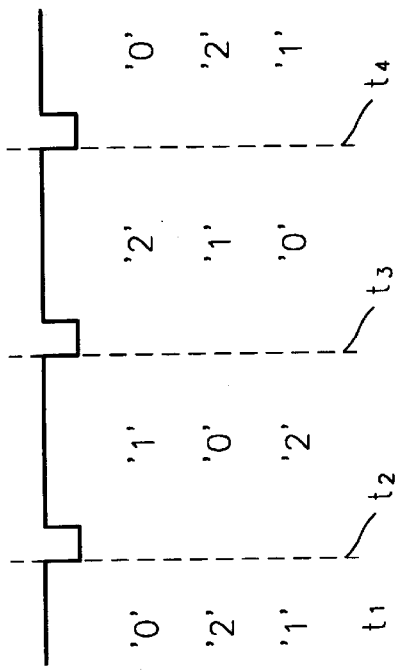
FIG. 2A (PRIOR ART)
FIG. 2B (PRIOR ART)
FIG. 2C (PRIOR ART)
FIG. 2D (PRIOR ART)

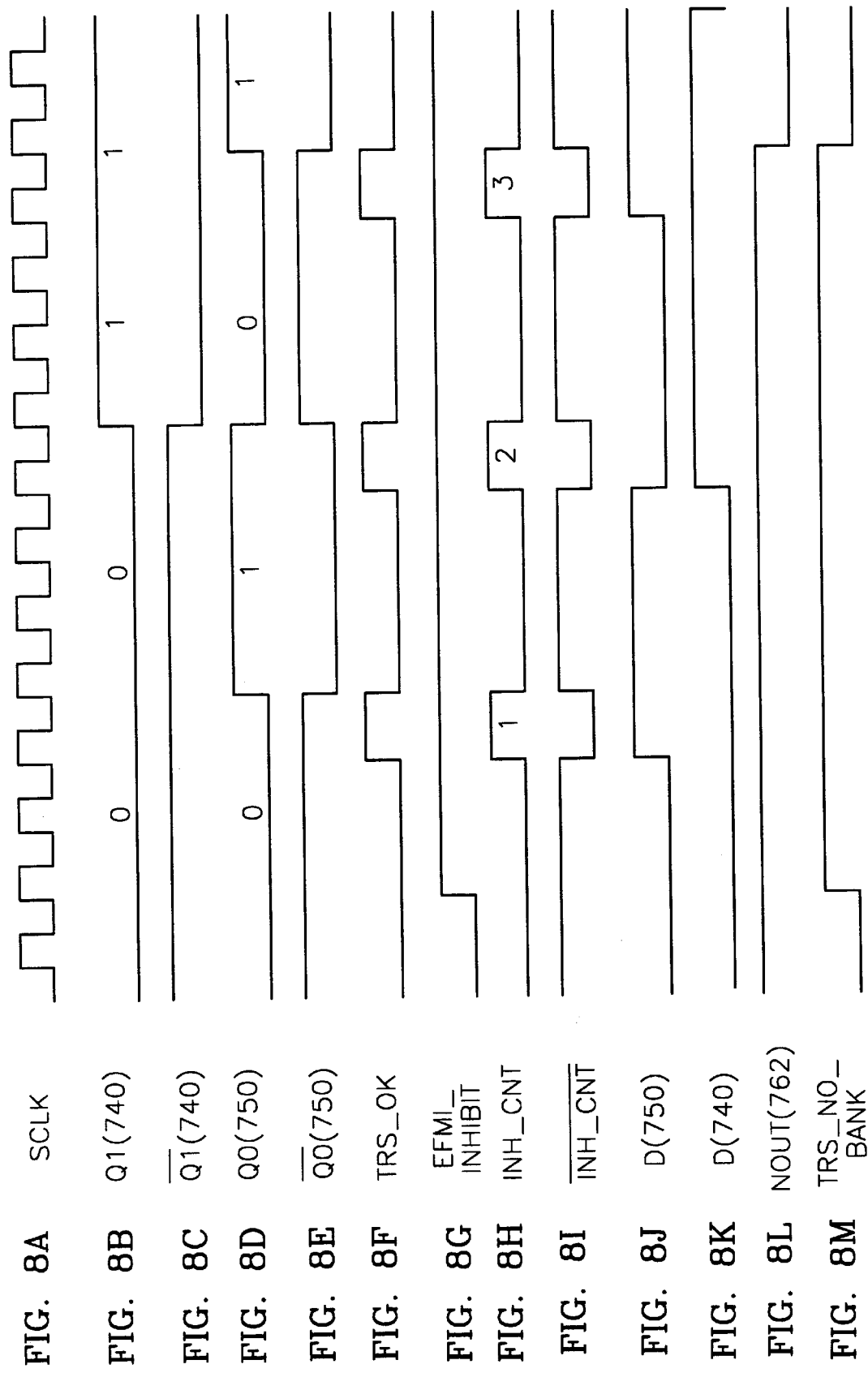

BANK POINTER COMPARATOR AND ADDRESS GENERATOR FOR A DVD-ROM SYSTEM

BACKGROUND OF THE INVENTION

FIG. 1 is a schematic block diagram of a conventional digital versatile disk ROM (DVDROM) system. Such a system typically includes a spindle/sled motor 100, an optical pickup 102, a RAM 120, a radio frequency (RF) amplifier 110, a data processor 130, a DRAM 140, an advanced technology attachment packet interface (ATAPI) unit 150, a digital servo 170 and a motor driver 160.

The spindle/sled motor 100 rotates a disk under the control of the motor driver 160. The optical pickup 102 emits a laser beam to the disk and senses reflected light as data to be read from the disk. The RF amplifier 110 amplifies an analog RF signal 103 output by the optical pickup 102 and generates eight-to-fifteen modulated (EFM) data 111.

The data processor 130 EFM-demodulates the EFM data from the RF amplifier 110 and writes the demodulated data 131 to an external memory 120, which is typically a RAM. The data processor 130 further corrects errors in the EFM-demodulated data 131 stored in the RAM 120 in an error-correction-coding (ECC) block unit, and writes the error-corrected data to the RAM 120. The error-corrected EFM data 132 is transferred to a host such as a personal computer via the ATAPI unit 150 upon a request from the host.

The digital servo 170 receives control signals 133 processed by the data processor 130 to control rotation of the motor, and tracking and focusing of the laser beam. The motor driver 160 generates a driving signal 161 for driving the spindle/sled motor 100 in accordance with control signals generated by the digital servo 170 to thereby control rotation of the disk.

The data processor 130 simultaneously performs three operations: writing of EFM-demodulated data (hereinafter, referred to as EFM-write), error-correction decoding of EFM-demodulated data (hereinafter, referred to as ECC), and transferring of error-corrected data to host (hereinafter, referred to as host-transmission). Accordingly, the RAM 120 is partitioned into three banks, i.e., bank 0, bank 1 and bank 2 for storing three ECC data blocks, one of the banks being used for EFM-write, another used for ECC, and another used for host-transmission. Since a single ECC block typically consists of 37,856 bytes of data in the DVD-ROM system, a 1 Mb RAM may be used for the external memory 120 to store three ECC blocks. To manage this process, the data processor 130 generates an ECC block synchronization signal (ECC SYNC) to process data in the ECC block units.

FIGS. 2A–2D illustrate the operation of the external memory 120. FIG. 2A shows an ECC block sync signal, FIG. 2B shows a bank pointer for EFM-write, FIG. 2C shows a bank pointer for ECC, and FIG. 2D shows a bank pointer for host-transmission.

When the DVD-ROM system is reset to perform an initial operation at time $t_1$, the bank pointer for EFM-write is set to '0', the bank pointer for ECC is set to '2', and the bank pointer for host-transmission is set to '1'. Accordingly, EFM-demodulated data is written into bank 0.

When EFM data of the first ECC block is completely written and the next ECC block is received at time $t_2$, the bank pointers for EFM-write, ECC, and host-transmission are changed into '1', '0', and '2', respectively, in response to the ECC block sync signal. Accordingly, EFM-demodulated data is written into bank 1, and error-correction decoding is carried out for data stored in bank 0. When a third ECC block is received at time $t_3$, the bank pointers for EFM-write, ECC, and host-transmission are changed to '2', '1', and '0', respectively. Thus, bank 2 is used for EFM-write, bank 1 is used for ECC, and bank 0 is used for host-transmission. At time $t_4$, the bank pointers return to '0', '2', and '1' respectively.

In the conventional system, when a new ECC block sync signal is generated and new bank pointers are set when the ECC operation or host-transmission has not fully completed for the respective current ECC block, the ECC and host-transmission operations for the current blocks are abandoned and EFM-write, ECC, and host-transmission is initiated for the following blocks, as designated by the bank pointers. In such a case, the data which has been EFMdemodulated but not ECC-decoded, or ECC-decoded but not transferred to the host is discarded. Accordingly, that data must be read again from the disk to be transferred, and consequently the data transfer rate between the DVD-ROM system and host is adversely affected.

In order to maintain the transfer rate, and to avoid discarding processed data, a DRAM 140 having a capacity of 4 Mb, 8 Mb or 16 Mb may be employed as a buffer in combination with, or instead of, the 1 Mb SRAM 120. In this system, the SRAM 120 and/or DRAM 140 are controlled so that data is balanced to prevent overflow or underflow of data stored therein. For example, when the data request rate from the ATAPI unit 150 is low, the buffer is controlled to prevent overflow. When the data request rate from the ATAPI unit 150 is high, the buffer is controlled to prevent underflow. In this configuration, manufacturing costs of the DVD-ROM system are increased due to the large size of the external memory, and system complexity is increased for maintaining data balance.

SUMMARY OF THE INVENTION

The present invention is directed to a digital versatile disk ROM (DVD-ROM) system, and more particularly, to a data processing apparatus and method for performing EFM data write, error correction, and host transfer operations in the DVD-ROM system.

An object of the present invention is to provide a data processing apparatus and method for a DVD-ROM system which performs EFM data write, error-correction decoding and host transmission operations by comparing bank pointers, such that a small-sized external memory can be employed, data can be transferred without loss, thereby increasing system data transfer rate.

In order to address the above object, there is provided a data processing apparatus for a digital versatile disk ROM system having an EFM demodulator for demodulating EFM data, a decoder for error-correction decoding demodulated data, a transfer unit for transferring error-corrected data to a host unit, and an external memory partitioned into first, second, and third banks for storing demodulated data, error-corrected data and transfer data. In the data processing apparatus, a bank pointer comparator generates first, second, and third bank pointers, compares the bank pointers with each other, and activates or deactivates predetermined enable signals in accordance with the comparision result. An address generator generates an address for writing and reading data to and from the external memory, and generates control signals for controlling the EFM-demodulating unit, error-correction decoding unit, and the transfer unit in response to the enable signals. The first, second, and third bank pointers represent the bank to which EFMdemodulated data is written, the bank in which error-corrected data is stored, and the bank from which transferred data is read, respectively.

To further address the above object, there is provided a method for controlling an EFM write operation, a decoding operation and a transfer operation in accordance with first, second, and third bank pointers, in a digital versatile disk ROM system which is interfaced with an external memory partitioned into three banks. The system includes a EFM demodulator for demodulating EFM data and for writing demodulated data to one of the banks, a decoder for error-correction decoding data stored in another one of the banks, and a transfer unit for transferring data stored in another one of the banks to an external host.

The method comprises the steps of: (a) determining whether the first, second, and third bank pointers are equal in value; (b) writing demodulated data in a first bank indicated by the first bank pointer and pausing the decoding operation and the transfer operation if it is determined in step (a) that the first, second, and third bank pointers are equal in value, and changing the first bank pointer when demodulated data is completely written; (c) determining whether any two of the first, second, and third bank pointers are the same if it is determined in step (a) that any one of the bank pointers is different from the other bank pointers; (d) executing a first operation and pausing a second operation if it is determined in step (c) that any two of the first, second, and third bank pointers are the same, and changing the first bank pointer value when the first operation is completed; and (e) writing demodulated data to a bank indicated by the first bank pointer, decoding data stored in a bank indicated by the second bank pointer, and transferring data stored in a bank indicated by the third bank pointer to an external host, if it is determined in the step (c) that none of the bank pointers are the same as the other bank pointers.

In a preferred embodiment, when the first bank pointer is equal in value to the second bank pointer, the first value is the first bank pointer and the second value is the second bank pointer, and the first operation is the EFM-write operation and the second operation is the decoding operation. When the second bank pointer is the same as the third bank pointer, the first value is the second bank pointer and the second value is the third bank pointer, and the first operation is the decoding operation and the second operation is the transfer operation. When the third bank pointer is same as the first bank pointer, the first value is the third bank pointer and the second value is the first bank pointer, and the first operation is the transfer operation and the second operation is the EFM-write operation.

The data processing apparatus according to the present invention increases each bank pointer when an operation associated with the bank pointer is completed rather than the conventional technique of increasing the bank pointers whenever the ECC block sync signal is input. Thus, the data processor ensures that current data is completely transferred before processing additional data.

The data processing apparatus according to the present invention can transfer data to a host without loss by controlling the EFM write, error-correction and transfer operations by use of bank pointers for each of the operations. When a write hold interrupt is generated by the system, no new EFM data can be written into a bank in which data is being transferred. Thus, data transfer is not performed repetitively for the same data in a bank. In this manner, the data transfer rate of the DVD-ROM system may be increased and system performance may be enhanced. Also, in an EFM write hold mode, an EFM write inhibit signal and a bank pointer comparison inhibit signal are generated to prevent new EFM data from being written to the transferring bank.

The data processing apparatus of the present invention manages external memory without the external control of the microprocessor. The present invention enables a manufacturer of the DVD-ROM system to reduce the size of external memory and thereby reduce system manufacturing costs.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a schematic block diagram of a conventional digital versatile disk (DVD)-ROM system.

FIGS. 2A–2D are illustrations for explaining the operation of the external memory of the DVD-ROM system shown in FIG. 1.

FIG. 8A through 8M are timing diagrams illustrating the operation of the comparison inhibit signal generator of FIG. 7.

DETAILED DESCRIPTION OF PREFERRED EMBODIMENTS

Figure 3:
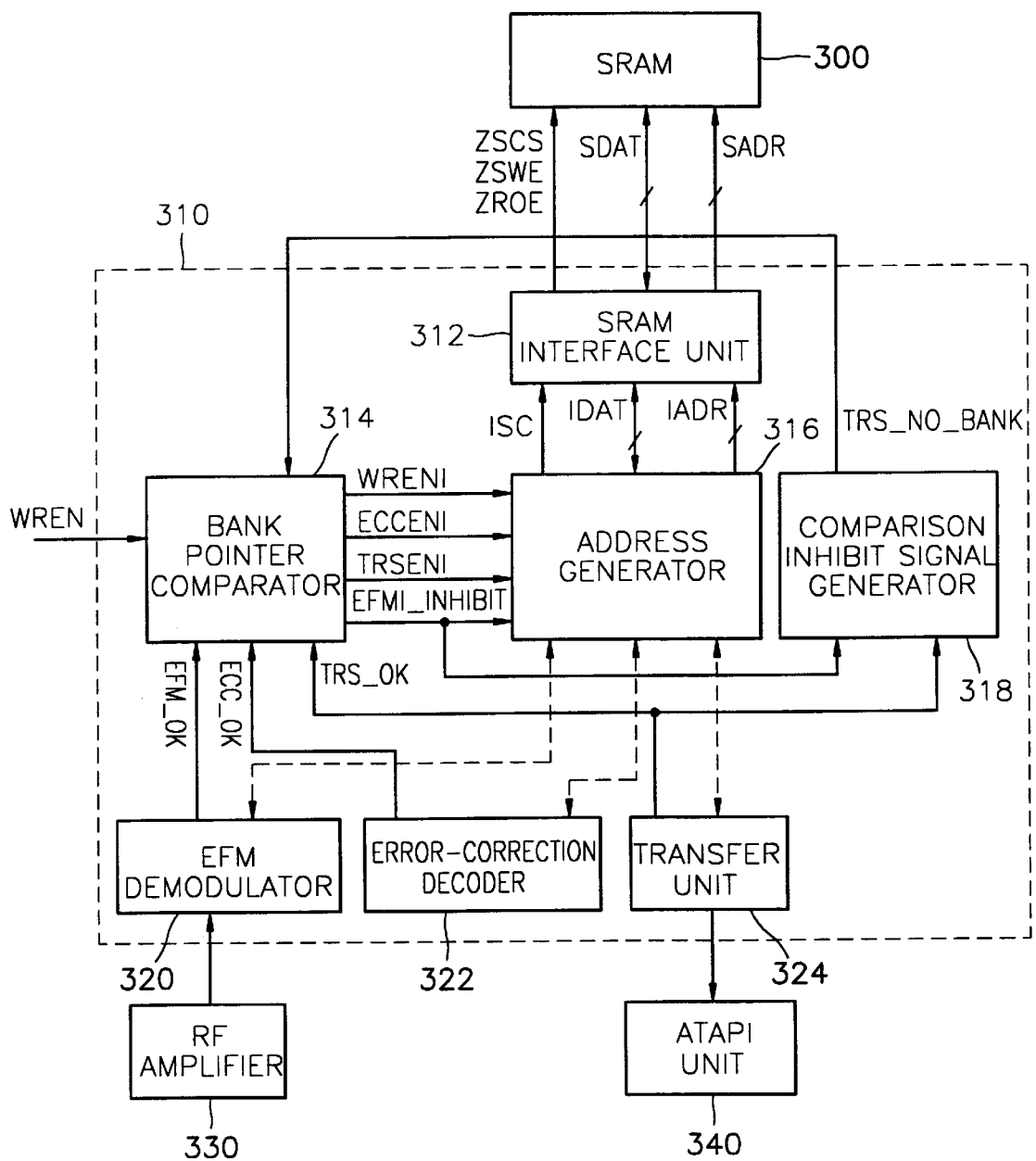
FIG. 3 is a block diagram of a data processor of a DVD-ROM system according to a preferred embodiment of the present invention.

Referring to FIG. 3, a data processor in accordance with the present invention includes an SRAM interface unit 312, an address generator 316, a bank pointer comparator 314, a comparison inhibit signal generator 318, an EFM demodulator 320, an error-correction decoder 322, and a transfer unit 324. An external SRAM 300, an RF amplifier 330 and an ATAPI unit 340 are coupled to the processor as shown.

The SRAM 300 is partitioned into three banks. In a preferred embodiment, the SRAM is accessed by a seventeen-bit address signal SADR and receives or sends data via an eight-bit data bus SDAT.

The bank pointer comparator 314 generates three bank pointers indicating the data types stored in three banks of the external SRAM 300, i.e., a first bank pointer EFMB indicating the bank into which demodulated data is to be written, a second bank pointer ECCB indicating the bank which stores data to be decoded, and a third bank pointer TRSB indicating the bank which stores data to be transferred to the host. Each of the first, second, and third bank pointers preferably has a value of "0", "1", or "2", however other values are applicable. Each of the bank pointer values is cyclically incremented in response to an EFM write completion signal EFM_OK, an error-correction completion signal ECC_OK and a transfer completion signal TRS_OK output, respectively, each from the EFM demodulator 320, the error-correction decoder 322, and the transfer unit 324.

The bank pointer comparator 314 further generates an EFM data write enable signal WRENI, an error-correction enable signal ECCENI and a transfer enable signal TRSENI. The enable signals are activated or deactivated in accordance with a comparison of the values of the first, second, and third bank pointers.

The bank pointer comparator 314 further generates an EFM write inhibit signal EFMI_INHIBIT when in an EFM write hold mode to prevent demodulated data from being written into a bank of which data is being transferred due to activation of the EFM write enable signal WRENI. The EFM write inhibit signal EFMI_INHIBIT is activated to 'high' level in response to a write hold signal WHINT generated by the bank pointer comparator 314 and deactivated in response to a write enable signal WREN applied by an external microprocessor (not shown).

The EFM demodulator 320 receives and demodulates an EFM signal and writes demodulated data to memory 300, in response to the write enable signal WRENI; the data being written to a bank of the SRAM 300 indicated by the first bank pointer. When the EFM demodulator 320 completes writing of the ECC data block, the EFM demodulator 320 outputs an EFM write completion signal EFM_OK.

The error-correction decoder 322 reads out data from a bank of the SRAM 300 indicated by the second bank pointer in response to the error-correction enable signal ECCENI, and corrects errors in the read data. The error-corrected data is written back into the SRAM 300. When the error-correction decoder 322 completes the decoding of the ECC block stored in the bank indicated by the second bank pointer, the error-correction decoder 322 outputs an error-correction completion signal ECC_OK.

The transfer unit 324 reads error-corrected data from the SRAM 300 bank indicated by the third bank pointer in response to the transfer enable signal TRSENI and transfers the data to a host, such as a personal computer (not shown), through the ATAPI unit 340. When the transfer unit 324 completely transfers the ECC block stored in the bank indicated by the third bank pointer, the transfer unit 324 outputs a transfer completion signal TRS_OK.

The address generator 316 generates an internal control signal ISC in response to the enable signals WRENI, ECCENI and TRSENI, and the EFM write inhibit signal EFMI_INHIBIT from the bank pointer comparator 314. The address generator 316 further generates internal addresses IADR for the SRAM 300. In the present embodiment, data written into or read from the SRAM 300 by the EFM demodulator 320, the decoder 322, or the transfer unit 324 is transferred through data lines indicated by dotted lines in FIG. 3 and the address generator 316. However, in an alternative embodiment of the present invention, data may be accessed directly though a data bus rather than passing through the address generator 316.

The SRAM interface unit 312 generates memory control signals such as a chip select signal ZSCS, a write enable signal ZSWE and a read enable signal ZROE in response to the internal control signals ISC, and outputs the control signals to the SRAM 300. When data is to be read from the SRAM 300, the SRAM interface unit 312 activates the read enable signal ZROE. When data is to be written into the SRAM 300, the SRAM interface unit 312 activates the write enable signal ZSWE.

The comparison inhibit signal generator 318 generates a transfer bank pointer comparison inhibit signal TRS_NO_BANK when in the EFM write hold mode, in response to the EFM write inhibit signal EFMI_INHIBIT from the bank pointer comparator 314, the transfer completion signal TRS_OK, and the write enable signal WREN from the external microprocessor. The comparison inhibit signal generator 318 outputs the transfer bank pointer comparison inhibit signal TRS_NO_BANK to the bank pointer comparator 314, so that the bank pointer comparator 314 does not compare the third bank pointers TRSB with other bank pointers, when the system is in EFM write hold mode. This prevents malfunction due to a repetitive transfer of the same data. The comparison inhibit signal generator 318 may be implemented by a counter, which is preferably a 2-bit counter.

Figure 4:
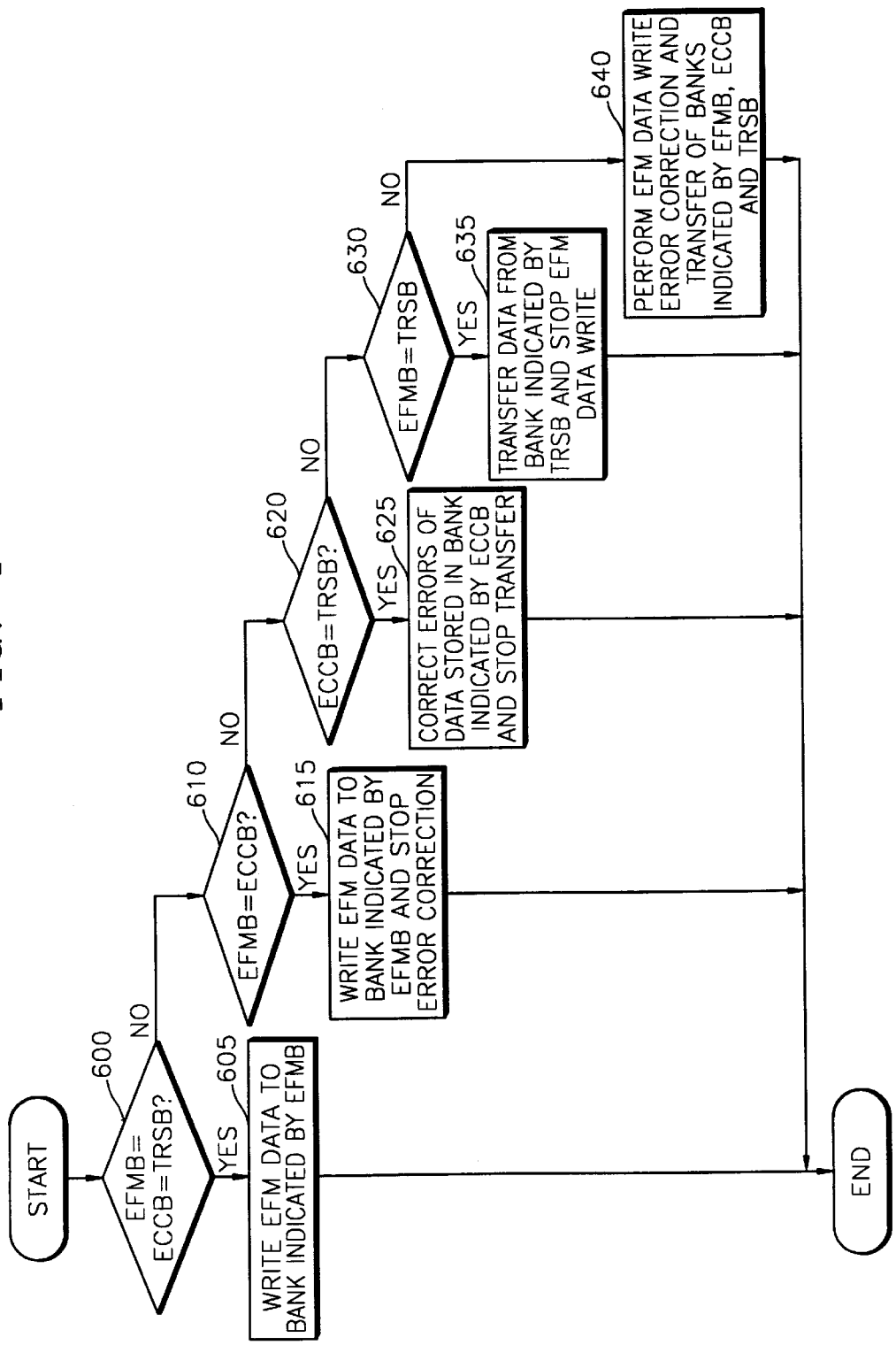
FIG. 4 is a flowchart summarizing the operation of the data processor of the present invention.

FIG. 4 is a flowchart summarizing the operation of the data processor of the present invention.

In step 600, the bank pointer comparator 314 determines whether all the bank pointers EFMB, ECCB, and TRSB are the same. That is, it is checked whether the following condition is met:

$$EFMB[1:0]=ECCB[1:0]=TRSB[1:0] \qquad (1)$$

If it is determined in the step 600 that all the bank pointers EFMB, ECCB and TRSB are of the same value, demodulated data is written into the bank indicated by the first bank pointer EFMB and the decoding operation and the transfer operation are paused (step 605)

Next, it is determined whether any two of the bank pointers EFMB, ECCB and TRSB are the same as each other if it is determined in step 600 that at least one of the bank pointers is different from the others (steps 610, 620, and 630).

In step 610, the bank pointer comparator 314 determines whether the first bank pointer EFMB and the second bank pointer ECCB are the same as each other. That is, it is checked whether the following condition is met:

$$EFMB[1:0]=ECCB[1:0] \neq TRSB[1:0] \qquad (2)$$

If it is determined in the step 610 that the first bank pointer EFMB is the same as the second bank pointer ECCB, EFM demodulation is executed and demodulated data is written into a bank indicated by the first bank pointer EFMB, but error correction decoding is paused (step 615). That is, since the EFM write operation is not completed for the bank indicated by second bank pointer ECC, the bank pointer comparator 314 disables an error-correction enable signal ECCENI to prevent data stored in that bank from being error-corrected even though the second bank pointer ECCB is incremented to the same value as the first bank pointer EFMB by the error-correction completion signal ECC_OK from the transfer unit 324.

If it is determined in step 610 that the first bank pointer EFMB is not the same as the second bank pointer ECCB, the bank pointer comparator 314 determines whether the second bank pointer ECCB and the third bank pointer TRSB are the same as each other (step 620). That is, it is determined whether the following condition is met:

$$EFMB[1:0] \neq ECCB[1:0]=TRSB[1:0] \qquad (3)$$

If it is determined in step 620 that the second bank pointer ECCB is the same as the third bank pointer TRSB, data stored in the bank indicated by the second bank pointer ECCB is error-correction decoded. At this time, however, since the decoding is not completed for data stored in the bank indicated by the third bank pointer TRSB, the bank pointer comparator 314 disables a transfer enable signal TRSENI to prevent data stored in the bank from being transferred to the host even though the third bank pointer TRSB is incremented to the same value as the second bank pointer ECCB by the transfer completion signal TRS_OK from the transfer unit 324 (step 625).

Meanwhile, if it is determined in the step 620 that the second bank pointer ECCB is not the same as the third bank pointer TRSB, the bank pointer comparator 314 next determines whether the third bank pointer TRSB is the same as the first bank pointer EFMB (step 630). That is, it is checked whether the following condition is met:.

$$EFMB[1:0]=TRSB[1:0] \ne ECCB[1:0] \qquad (4)$$

If it is determined in step 630 that the third bank pointer TRSB is the same as the first bank pointer EFMB, data stored in the bank indicated by the third bank pointer TRSB is transferred to the host. At this time, however, since the host transfer operation is not completed for data stored in the bank indicated by the third bank pointer TRSB, the bank pointer comparator 314 disables a EFM write enable signal EFMENI to prevent new data from being written into the bank even though the first bank pointer EFMB is incremented to the same value as the third bank pointer TRSB by the EFM write completion signal EFM_OK from the EFM demodulator (step 635).

If it is determined in the step 630 that the third bank pointer TRSB is different from the first bank pointer EFMB, then all three pointers are different, and the bank pointer comparator 314 activates the EFM write enable signal WRENI, the error-correction enable signal ECCENI and the transfer enable signal TRSENI. Thus, EFM data is demodulated by the EFM demodulator 320 and written into the bank indicated by the first bank pointer EFMB. Also, data stored in the bank indicated by the second bank pointer ECCB is decoded by the decoder 322, and data stored in the bank indicated by the third bank pointer TRSB is transferred to an external host (step 640).

FIGS. 5A through 5K are timing diagrams which illustrate an example of the operation of the data processor of FIG. 3. FIG. 5A shows an ECC block sync signal ECC SYNC. FIG. 5B shows the EFM data write completion signal EFM_OK from the EFM demodulator 320, FIG. 5C shows the error-correction completion signal ECC_OK from the decoder 322, and FIG. 5D shows the transfer completion signal TRS_OK from the transfer unit 324. FIGS. 5E through 5G show the write enable signal WRENI, the error-correction enable signal ECCENI, and the transfer enable signal TRSENI, respectively, output by the bank pointer comparator 314. FIG. 5H shows a write hold signal WHINT. FIGS. 5I through 5K show the first bank pointer EFMB, the second bank pointer ECCB, and the transfer bank pointer TRSB, respectively.

Referring to FIGS. 5I through 5K, after initialization of the DVD-ROM system, the first, second, and third bank pointers EFMB, ECCB and TRSB are set a same value, i.e., '2', as shown at interval T1. If the write enable signal WRENI is activated, EFM demodulated data is written to the SRAM 300 through the address generator 316 and the SRAM interface unit 312. Since the first bank pointer EFMB is '2', EFM demodulated data is written to the bank 2 of the SRAM 300. At this time, since the condition of the equation 1 is satisfied, the error-correction enable signal ECCENI and the transfer enable signal TRSENI are deactivated so that neither the error-correction operation nor the transfer operation is executed.

Upon completion of the EFM write operation, the EFM demodulator 320 generates the EFM write completion signal EFM_OK. The bank pointer comparator 314 cyclically increments the first bank pointer EFMB to '0' in response to the EFM write completion signal EFM_OK (interval T2). Thus, the next block of demodulated data is written to bank 0 of the SRAM 300. At this time, the error-correction enable signal ECCENI is activated. Since the second bank pointer is '2', data stored in bank 2 is accessed and error-correction decoded. However, since the condition of equation 3 is satisfied, the transfer operation is not executed even though the ECC block sync signal is generated.

When error-correction of data stored in the bank 2 is completed, the error-correction decoder 322 outputs an error-correction completion signal ECC_OK. The bank pointer comparator 314 increments the second bank pointer to '0' (interval T3). However, since the first and second bank pointers EFMB and ECCB are the same, the bank pointer comparator 314 deactivates the error-correction enable signal ECCENI so that error-correction decoding of the data stored in the bank 0 is not executed. The bank pointer comparator 314 further activates the transfer enable signal TRSENI since the third bank pointer TRSB is now different from the second bank pointer ECCB. Thus, the transfer of data stored in bank 2 is initiated.

Meanwhile, when the demodulated data is completely written into bank 0, the EFM demodulator 320 generates the EFM write completion signal EFM_OK. Upon reception of the EFM write completion signal EFM_OK, the bank pointer comparator 314 increases the first bank pointer to '1' and reactivates the error-correction enable signal ECCENI (interval T4). Thus, the next block of EFM demodulated data is written into bank 1. Also, data stored in bank 0 is error-correction decoded since the error-correction enable signal ECCENI is activated. Data stored in bank 2 continues to be transferred to the host.

As described above, according to the data processor of the DVD-ROM system of the present invention, the EFM write, error-correction decoding, and host transmission operations are controlled in accordance with the comparison of the bank pointers. Thus, EFM data is written into the SRAM 300, error-corrected, and transferred to the host without any loss of data.

Interval T5, however, shows a state in which the third and first bank pointers TRSB and EFMB have the same value of '0'. In such a case, the condition of the equation 4 is satisfied. Thus, the EFM write enable signal WRENI of FIG. 5E is deactivated and EFM write operation is paused. However, since the optical pickup 102 continuously reads out recorded signals, some data may be lost while the EFM write operation is paused. To address this problem, the related servo control is preferably adapted to react to the paused EFM write operation.

When the third and first bank pointers TRSB and EFB have the same value, the bank pointer comparator 314 outputs a write hold signal WHINT, preferably an active-low signal, to the external microprocessor to inform an interrupt of the EFM write operation. Upon receiving the write hold signal WHINT, the microprocessor controls the digital servo such that a target position to be accessed is re-designated. Thus, EFM data having an address consecutive to those data already demodulated may be read out and demodulated, to maintain continuity of the demodulated data.

In this state, the data processor 310 continues the transfer of data stored in the bank 0 currently under transfer. Also, the data processor 310 continues to transfer data stored in banks 1 and 2, previously error-corrected or under an error-correction operation when the write hold signal WHINT was issued (interval T6). The bank pointers will eventually have the same value of '0' in this example. At the beginning of interval T8, the target position of the disk is redesignated under the control of the microprocessor. After the target position is designated, the bank pointer comparator 314 reactivates the EFM write enable signal WRENI so that EFM demodulation is resumed. Demodulated data in the interval T8 is stored in bank 0.

When the third and first bank pointers TRSB and EFB have the same value, the bank pointer comparator 314 further activates an EFM write inhibit signal EFMI_INHIBIT. The comparison inhibit signal generator 318 generates a transfer bank pointer comparison inhibit signal TRS_NO_BANK in response to the EFM write inhibit signal EFMI_INHIBIT. The comparison inhibit signal generator 318 deasserts the transfer bank pointer comparison inhibit signal TRS_NO_BANK when data stored in the bank indicated by third bank pointer TRSB is completely transferred.

The EFM write inhibit signal EFMI_INHIBIT and the transfer bank pointer comparison inhibit signal TRS_NO_BANK, which are used to stably transfer data to the host in the EFM write hold mode, will be described in detail with reference to FIG. 6.

In general, the DVD-ROM system is designed so that the speed of the EFM write operation for a given ECC block is slower than the speed of the transfer operation of the same block. For example, in a DVD operating in 4.5× speed, the EFM write speed is typically 7.2 Mbytes/s, and the transfer speed is typically designed to be 9~10 Mbytes/s. However, since the transmission from the ATAPI unit 340 to the host is performed in a hand-shaking operation, there is a chance that the transfer operation of the ECC block will consume more time than the EFM write operation. In a worst case scenario, it is possible that the data processor 310 cannot transfer even a single ECC block data completely during the time in which one to three ECC blocks are written to the SRAM 300.

In such a case, demodulated data is error-corrected and transferred to the host while preventing further demodulated data from being written into the SRAM 300. This is referred to as "EFM write hold mode" in the present invention. In the EFM write hold mode operation, the data processor 310 according to the present invention prevents further demodulated data from being written into the SRAM 300 and transfers data stored in the SRAM 300 completely and stably to the host.

FIGS. 6A through 6N are timing diagrams which illustrate an example of the operation of the data processor of FIG. 3 in EFM write hold mode. FIG. 6A shows an ECC block sync signal ECC SYNC. FIGS. 6B through 6D show the EFM data write completion signal EFM_OK, the error-correction completion signal ECC_OK, and the transfer completion signal TRS_OK, respectively. FIGS. 6E through 6G show the EFM write enable signal WRENI, the error-correction enable signal ECCENI, and the transfer enable signal TRSENI, respectively. FIG. 6H shows the write hold signal WHINT, and FIG. 6I shows the EFM write inhibit signal EFMI_INHIBIT. FIG. 6J shows a transfer bank pointer comparison inhibit signal TRS_NO_BANK. FIG. 6K shows a write enable signal WREN applied by an external microprocessor (not shown). FIGS. 6L through 6N show the first bank pointer EFMB, the second bank pointer ECCB, and the transfer bank pointer TRSB, respectively.

Figure 5:
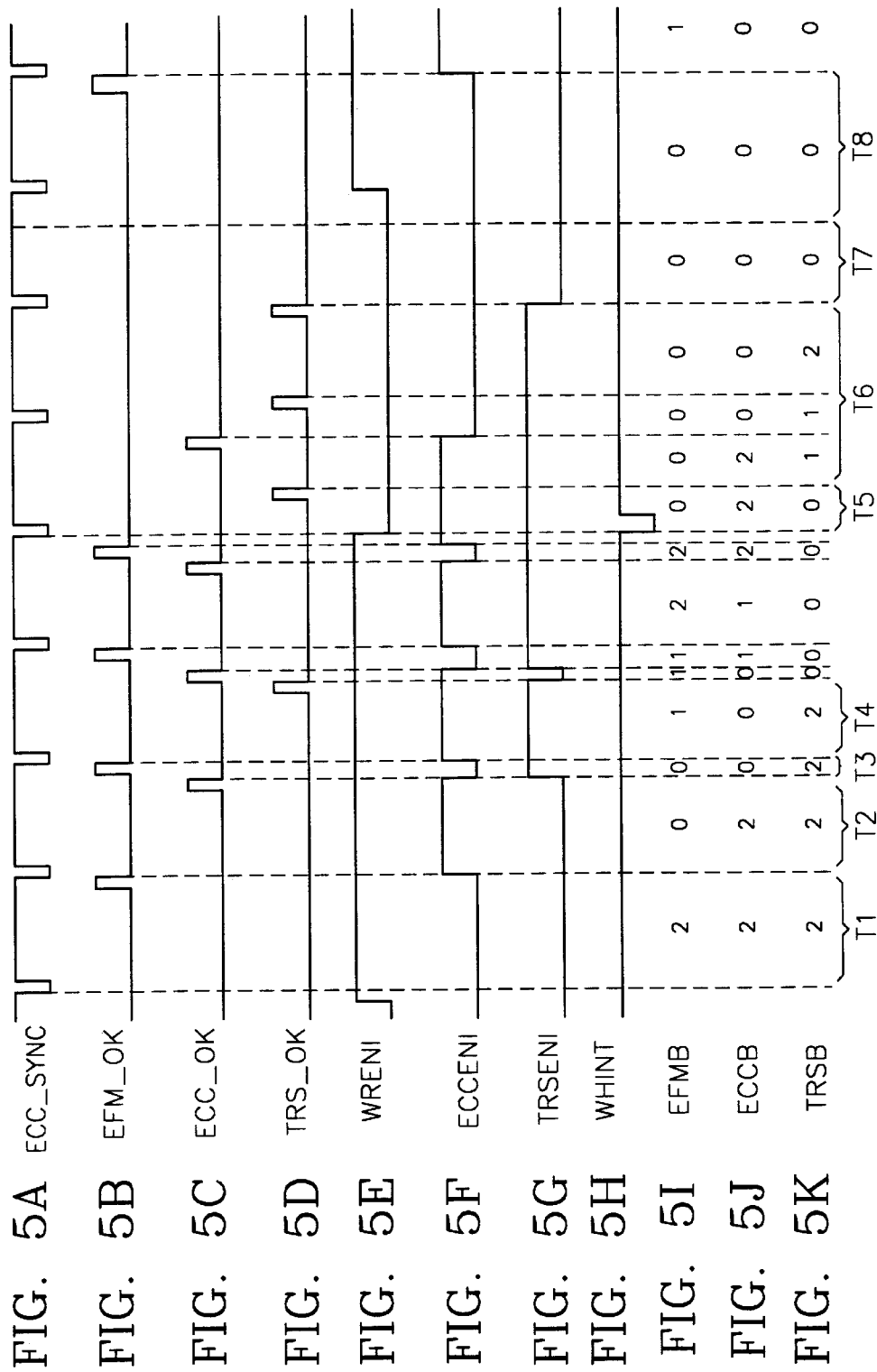
FIGS. 5A through 5K are timing diagrams illustrating the operation of the data processor of FIG. 3.
Figure 6:
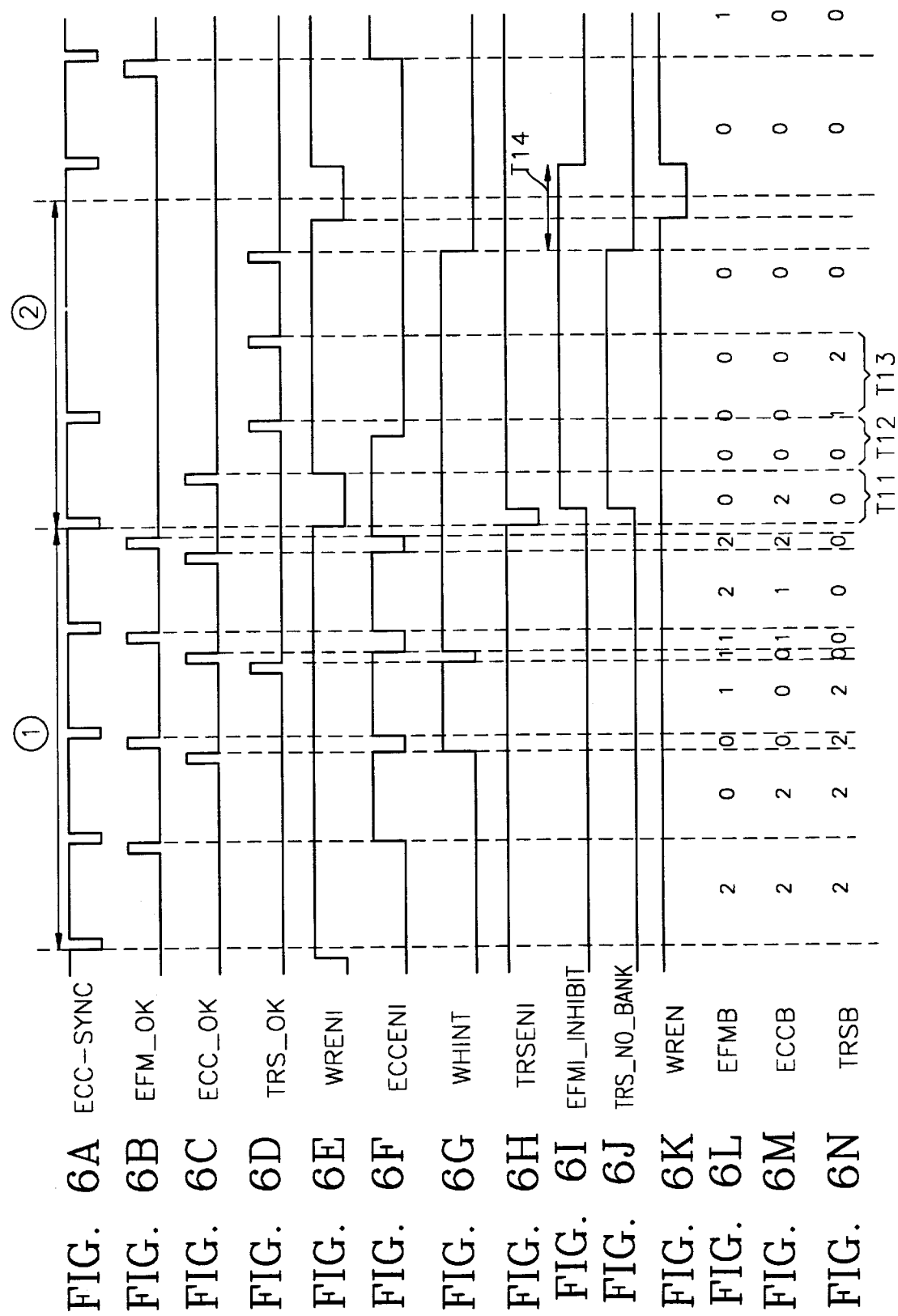
FIGS. 6A through 6N are timing diagrams which illustrate the operation of the data processor of FIG. 3 in a write hold mode.

The operation of the data processor in interval (1) of FIG. 6 is similar to the operation of FIG. 5. Interval (2) of FIG. 6 indicates the EFM write hold mode.

At interval T11, it is assumed that the first through third bank pointers are '0', '2' and '0', respectively. If the transfer completion signal TRS_OK is generated earlier than the error-correction completion signal ECC_OK, then normal data flow occurs as described above in connection with FIGS. 5E and 5I through 5K. However, if the error-correction completion signal ECC_OK is generated earlier than the transfer completion signal TRS_OK as shown in FIGS. 6C and 6D, then a conflict occurs. That is, since the first, second, and third bank pointers are '0's and the condition of the Equation 1 is satisfied, the write enable signal WRENI may be activated. Thus, new demodulated data may be written into bank 0 even though the transfer operation has not been completed for the previous ECC block. To resolve this conflict, the bank pointer comparator 314 activates EFM write hold mode and enables the EFM write inhibit signal EFMI_INHIBIT regardless of the condition of Equation 1 to inhibit the EFM write operation.

Referring to FIGS. 6H and 6I, the EFM write inhibit signal EFMI_INHIBIT is preferably activated at a rising edge of the write hold signal WHINT of FIG. 6H, that is, when the write hold signal WHINT (active-low) is deactivated to 'high'. At this time, the data stored in the SRAM 300 is completely transferred to the host while the EFM write operation is paused (intervals T12 and T13). In other words, just after the write hold signal WHINT is activated, the bank pointer comparator 314 does not activate the write enable signal WRENI even though the first, second, and third bank pointers EFMB, ECCB and TRSB satisfy the condition of equation 1. The EFM write inhibit signal EFMI_INHIBIT is deactivated to 'low' at a timing when the write enable signal WREN from the microprocessor is activated to 'high' after being deactivated to 'low'.

Meanwhile, when the microprocessor re-designates the new target position on the disk and the digital servo controls the corresponding position, the microprocessor deactivates the write enable signal WREN. Interval T14 designates a time period in which the write enable signal WREN is maintained at inactive 'low' level after the transfer operation is completed. The interval T14 is a time during which several transfer operations may take place in the case of a high-speed DVD-ROM system. Thus, during the interval T14, previously-transferred data may be re-transferred to the host.

This problem of re-transfer of data is obviated by the use of a transfer bank pointer comparison inhibit signal TRS_NO_BANK, which is generated by the comparison inhibit signal generator 318. In the present embodiment, the bank pointer comparator 314 operates in the EFM hold mode when the bank pointer comparison inhibit signal TRS_NO_BANK is activated to 'high' level.

Referring to FIGS. 6I and 6J, the comparison inhibit signal generator 318 activates the bank pointer comparison inhibit signal TRS_NO_BANK to a 'high' level when the EFM write inhibit signal EFMI_INHIBIT from the bank pointer comparator 314 is activated to a 'high' level. Next, the comparison inhibit signal generator 318 counts the number of the transfer completion signals TRS_OK from the transfer unit 324. When the comparison inhibit signal generator 318 determines that the number of the transfer completion signals TRS_OK matches the number of ECC blocks which were not transferred when the EFM write inhibit signal EFMI_INHIBIT was issued, three in this example, the comparison inhibit signal generator 318 deactivates the bank pointer comparison inhibit signal TRS_NO_BANK to 'low'. Upon receiving the bank pointer comparison inhibit signal TRS_NO_BANK of 'low' level, the bank pointer comparator 314 reenters the bank pointer comparison mode and deactivates the transfer enable signal TRSENI.

Referring to FIGS. 6L through 6N, it can be seen that, when the bank pointer comparison inhibit signal TRS_NO_BANK is activated, the third bank pointer TRSB is incremented from '0' to '2' while the first and second bank pointers EFMB and ECCB are maintained at '0' and thus data stored in the banks 0, 1 and 2 are sequentially transferred to the host. Thus, data can be stably transferred without any loss or repetitive transfer.

Figure 7:
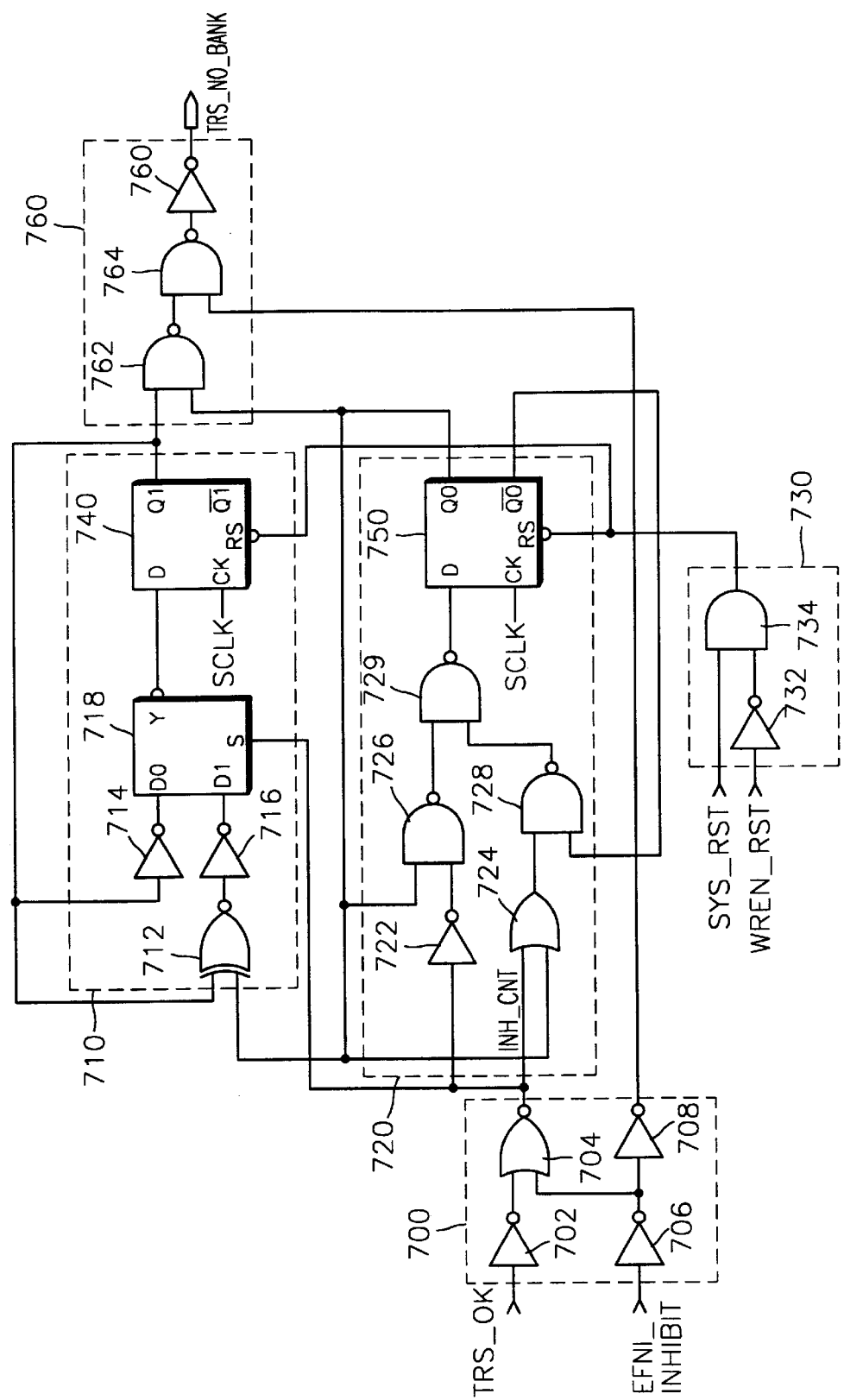
FIG. 7 is a circuit diagram of a preferred embodiment of a comparison inhibit signal generator shown in FIG. 3.

FIG. 7 is a circuit diagram of a preferred embodiment of the comparison inhibit signal generator 318 shown in FIG. 3. The comparison inhibit signal generator 318 includes a counting input signal generator 700, a first counting signal generator 720, a second counting signal generator 710, a reset controller 730 and a signal output unit 760.

In the counting input signal generator 700, invertors 702 and 704 invert the transfer completion signal TRS_OK received from the transfer unit 324 and the EFM write inhibit signal EFMI_INHIBIT received from the bank pointer comparator 314, respectively. A NOR gate 704 executes a NOR operation with respect to the output signals of the invertors 702 and 704 and outputs an operation result to the first and second counting signal generators 720 and 710 as a counting input signal INH_CNT. An inverter 708 inverts the output signal of the inverter 706. Thus, the EFM write inhibit signal EFMI_INHIBIT is delayed a predetermined time period by serially-connected invertors 706 and 708.

In the first counting signal generator 720, an inverter 722 receives and inverts the counting input signal INH_CNT. An NAND gate 726 performs a NAND operation with respect to the output of the inverter 722 and a positive output Q0 of a flip-flop 750. An OR gate 724 performs an OR operation with respect to the counting input signal INH_CNT and the positive output Q0 of a flip-flop 750. A NAND gate 728 performs a NAND operation with respect to the output of the OR gate 724 and a negative output /Q0 of the flip-flop 750. A NAND gate 728 performs a NAND operation with respect to the outputs of the NAND gates 726 and 728 and outputs an operation result to a data input terminal D of the flip-flop 750. The output of the NAND gate 729 toggles its logical level at each rising edge of the transfer completion signal TRS_OK. The flip-flop 750 outputs the signal received through its data input terminal D, as a first counting signal, in response to a system clock signal SCLK.

In the second counting signal generator 710, an inverter 714 receives and inverts a positive output Q1 of a flip-flop 740. An exclusive-OR gate 712 performs an exclusive-OR operation with respect to the positive output Q0 of the flip-flop 750 and the positive output Q1 of the flip-flop 740. An inverter 714 receives and inverts the output of the inverter 712. A multiplexer 718 receives the outputs of the invertors 714 and 716 as its data inputs, and the counting input signal INH_CNT as a selection control signal. The multiplexer 718 selects one of the outputs of the invertors 714 and 716 in response to the selection control signal, inverts the selected signal, and outputs the inverted signal to a data input terminal D of the flip-flop 740. In detail, the multiplexer 718 selects the output of the inverter 714 when the selection control signal is 0, and the output of the inverter 716 when the selection control signal is 1. The flip-flop 740 outputs the signal received through its data input terminal D, as a second counting signal, in response to the system clock signal SCLK. The second counting signal has a frequency which is a half of the frequency of the first counting signal.

In the reset controller 730, an inverter receives and inverts an write enable reset signal WREN_RST. An AND gate performs an AND operation with respect to a system reset signal SYS_RST and the write enable reset signal WREN_RST, and outputs an operation result as a reset signal RS to the flip-flops 750 and 740. Here, the system reset signal SYS_RST is a signal for resetting the apparatus of FIG. 7 when the apparatus is initialized. Also, the write enable reset signal WREN_RST is a signal obtained from the write enable signal WREN. Thus, the comparison inhibit signal generator 318 is reset when a system reset signal SYS_RST is activated to 'low', or a write enable signal WREN is activated to 'high'.

In the signal output unit 760, a NAND gate 762 performs a NAND operation with respect to the positive output Q0 of the flip-flop 750 and the positive output Q1 of the flip-flop 740. Also, a NAND gate 764 performs a NAND operation with respect to the output of the NAND gate 762 and the delayed EFM write inhibit signal EFMI_INHIBIT from the counting input signal generator 700. An inverter 766 receives and inverts the output of the NAND gate 766, and outputs the inverted signal as the transfer bank pointer comparison inhibit signal TRS_NO_BANK. When the EFM write inhibit signal EFMI_INHIBIT is at a 'high' level, the transfer bank pointer comparison inhibit signal TRS_NO_BANK is deactivated to 'low' if all the first and second counting signals are 'high'.

FIG. 8A through 8M are timing diagrams of signals in the comparison inhibit signal generator of FIG. 7. Specifically, FIG. 8A shows the system clock signal SCLK, FIG. 8B shows the positive output Q1 of the flip-flop 740, FIG. 8C shows a negative output Q1 of the flip-flop 740, FIG. 8D shows the positive output Q0 of a flip-flop 750, and FIG. 8E shows the negative output Q0 of the flip-flop 750. FIG. 8F shows the transfer completion signal TRS_OK, FIG. 8G shows the EFM write inhibit signal EFMI_INHIBIT, FIG. 8H shows the counting input signal INH_CNT, FIG. 8I shows the inversion of the counting input signal INH_CNT, FIG. 8J shows input data D of the flip-flop 750, FIG. 8K shows input data D of the flip-flop 740, FIG. 8L shows the output of the NAND gate 762 of the signal output unit 760, and FIG. 8M shows a transfer bank pointer comparison inhibit signal TRS_NO_BANK.

The operation of the comparison inhibit signal generator 318 of FIG. 7 will now be described with reference to FIG. 8.

When transfer completion signal TRS_OK is input to the circuit of FIG. 7 under a condition that the EFM write inhibit signal EFMI_INHIBIT of FIG. 8G is activated to 'high', the NOR gate 704 outputs the counting input signal INH_CNT at a 'high' level. The counting input signal INH_CNT of FIG. 8H is applied to the first and second counting signal generators 720 and 710. The counting input signal INH_CNT is input to the OR gate 724 and OR-operated with the positive output Q0 of the flip-flop 750. Since no counting value exists at the initial state, the positive output Q0 of flip-flop 750 is at a 'low' level. Thus, an output of the OR gate 724 becomes 'high', and the NAND gate 728 output is at a 'high' level.

Meanwhile, the counting input signal INH_CNT is inverted by the inverter 722 and applied to the second input of the NAND gate 726. At this time, the NAND gate 726 outputs a 'high' level. The data input D of the first flip-flop 750 is held at a 'high' level between the first and second rising edges of the transfer completion signal TRS_OK, and at a 'low' level between the second and third rising edges of the transfer completion signal TRS_OK, as shown in FIG.

8I. When the third rising edge of the third transfer completion signal TRS_OK is applied, the data input D of the flip-flop 750 becomes 'high'. The flip-flop 750 outputs data D through the positive output terminal Q0 in response to the system clock signal SCLK.

The data input D of the flip-flop 740 is maintained at 'low' level, and changes to 'high' level when the second rising edge of the second transfer completion signal TRS_OK is input. Accordingly, the output of the NAND gate 762 has a waveform of FIG. 8I. That is, the output of the NAND gate 762 is maintained at 'high' level, and changes 'low' level at a third falling edge of the transfer completion signal TRS_OK. The output of the NAND gate 762 is exclusive-OR operated with the delayed EFM write inhibit signal EFMI_INHIBIT by the NAND gate 764. The operation is inverted by the inverter 766 to be output as a transfer bank pointer comparison inhibit signal TRS_NO_BANK. Referring to FIG. 8M, the transfer bank pointer comparison inhibit signal TRS_NO_BANK is activated to 'high' INHIBIT becomes 'high' level, and deactivated to 'low' when three transfer completion signals TRS_OK are counted.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A data processing apparatus for a digital versatile disk ROM system having a demodulator for demodulating data, a decoder for error-correction decoding demodulated data, a transfer unit for transferring error-corrected data to a host unit, said data processing apparatus adapted to communicate with an external memory partitioned into first, second, and third banks for storing demodulated data, error-corrected data and transfer data, said data processing apparatus comprising:

a bank pointer comparator for generating first, second, and third bank pointers, and for comparing the first, second, and third bank pointers and activating or deactivating enable signals in accordance with comparison results;

an address generator for generating an address for writing and reading data to and from said external memory, and for generating control signals for controlling said demodulating unit, said error-correction decoding unit, and said transfer unit in response to the enable signals; and wherein the first, second, and third bank pointers represent the bank to which demodulated data is written, the bank in which error-corrected data is stored, and the bank from which transfer data is read.

2. The data processing apparatus of claim 1, wherein said bank pointer comparator further increments the first bank pointer when an write operation has completed, increments the second bank pointer when the error correction operation has completed, and increments the third bank pointer when the transfer operation has completed.

3. The data processing apparatus of claim 1, wherein said bank pointer comparator sets the first, second, and third bank pointers to the same value when said data processing apparatus is initialized.

4. The data processing apparatus of claim 1, wherein said bank pointer comparator activates an write enable signal when the first, second, and third bank pointers have same values.

5. The data processing apparatus of claim 4, wherein if the first, second, and third bank pointers do not have the same values, said bank pointer comparator deactivates a transfer enable signal when the values of the second and third bank pointers are the same.

6. The data processing apparatus of claim 4, wherein if the first, second, and third bank pointers do not have the same values, said bank pointer comparator deactivates an error-correction enable signal when the values of the first and second bank pointers are the same.

7. The data processing apparatus of claim 4, wherein if the first, second, and third bank pointers do not have the same values, said bank pointer comparator deactivates the write enable signal when the values of the first and third bank pointers are the same.

8. The data processing apparatus of claim 1, further comprising:

a comparison inhibit signal generator for generating a third bank pointer comparison inhibit signal in response to a write inhibit signal and a transfer completion signal from said transfer unit, wherein said bank pointer comparator generates the write inhibit signal in an write hold mode, wherein said bank pointer comparator does not compare the third bank pointers with the first or second bank pointer when the third bank pointer comparison inhibit signal is generated, and wherein said address generator controls said external memory so that demodulated data is prevented from being written to said external memory when the write inhibit signal is activated.

9. The data processing apparatus of claim 8, wherein said bank pointer comparator generates a write hold signal in the write hold mode, and activates the write inhibit signal when the write hold signal is generated.

10. The data processing apparatus of claim 8, wherein said bank pointer comparator deactivates the write inhibit signal in response to an externally-applied write enable signal.

11. The data processing apparatus of claim 8, wherein said comparison inhibit signal generator deactivates the third bank pointer comparison inhibit signal in response to a transfer completion signal.

12. The data processing apparatus of claim 8, wherein said comparison inhibit signal generator is reset in response to a predetermined system reset signal or an externally-applied write enable signal.

13. The data processing apparatus of claim 8, wherein said comparison inhibit signal generator comprises:

a counting input signal generator for outputting the transfer completion signal as a counting input signal in response to the write inhibit signal;

a first counting signal generator for generating a first counting signal changing logic level each rising edge of the first counting signal;

a second counting signal generator for generating a second counting signal which changes logic level at a frequency of half of the frequency of the first counting signal;

a reset controller for logically combining the write enable reset signal with the system reset signal to generate a counting reset signal; and signal output means for logically combining the first counting signal with the second counting signal and outputting the logical combination result as the third bank pointer comparison inhibit signal in response to the write inhibit signal.

14. The data processing apparatus of claim 13, wherein said first counting signal generator comprises:

a first flip-flop for outputting a predetermined first input data as the first counting signal in response to a system clock signal;

a first logic means for performing an OR operation with respect to the counting input signal and a positive output of said first flip-flop;

a second logic means for performing a NAND operation with respect to an output of said first logic means and a negative output of said first flip-flop;

a third logic means for performing a NAND operation with respect to an inversion of the counting input signal and the positive output of said first flip-flop; and a fourth logic means for performing a NAND operation with respect to an output of said second logic means and an output of said third logic means to output an operation result as the first input data.

15. The data processing apparatus of claim 13, wherein said second counting signal generator comprises:

a second flip-flop for outputting a predetermined second input data as the second counting signal in response to the system clock signal;

a fifth logic means for performing an exclusive-OR operation with respect to the positive output of said first flip-flop and a positive output of said second flip-flop;

a first inverter for inverting an output of said fifth logic means;

a second inverter for inverting the positive output of said second flip-flop; and a multiplexer for receiving the output of said first inverter and the output of said second inverter as first and second input signals and selecting one of the input signals in response to the counting input signal.

16. The data processing apparatus of claim 1 wherein the demodulator is an EFM demodulator.

17. In a data processing apparatus for a digital versatile disk ROM system which is interfaced with an external memory partitioned into three banks, the data processing apparatus having a demodulator for demodulating data and writing demodulated data in one of the banks, a decoder for error-correction decoding data stored in another one of the banks, and a transfer unit for transferring data stored in another one of the banks to an external host unit, a data processing method for controlling an data write operation, a decoding operation and a transfer operation in accordance with first, second, and third bank pointers, the method comprising:

(a) determining whether the first, second, and third bank pointers are all equal in value;

(b) writing demodulated data in a first bank indicated by the first bank pointer and pausing the decoding operation and the transfer operation if it is determined in said step (a) that the first, second, and third bank pointers are equal in value and changing the first bank pointer when demodulated data is completely written;

(c) determining whether any two of the first, second, and third bank pointers are equal in value if it is determined in said step (a) that any one of the bank pointers is different from another bank pointer;

(d) executing a first operation and pausing a second operation if it is determined in said step (c) that any two of the first, second, and third bank pointers are equal in value and changing the a first value when the first operation is completed, wherein when the first bank pointer is equal in value to the second bank pointer, the first value is the first bank pointer and the second value is the second bank pointer, and the first operation is the data write operation and the second operation is the decoding operation, wherein, when the second bank pointer is equal in value to the third bank pointer, the first value is the second bank pointer and the second value is the third bank pointer, and the first operation is the decoding operation and the second operation is the transfer operation, wherein, when the third bank pointer is equal in value to the first bank pointer, the first value is the third bank pointer and the second value is the first bank pointer, and the first operation is the transfer operation and the second operation is the data write operation; and (e) writing demodulated data to a bank indicated by the first bank pointer, decoding data stored in a bank indicated by the second bank pointer, and transferring data stored in a bank indicated by the third bank pointer to an external host if it is determined in said step (c) that no bank pointers have the same value.

18. The method of claim 17, wherein said step (d) further comprises the steps of:

generating a write hold signal when the third bank pointer is equal in value to the first bank pointer;

generating an write inhibit signal, in response to the write hold signal, for preventing demodulated data from being written to a bank indicated by the third bank pointer;

generating a comparison inhibit signal, in response to the write inhibit signal, for inhibiting a comparison of the third bank pointer with the first or second bank pointer; and deactivating the comparison inhibit signal when predetermined data stored in the external memory is completely transferred to the host.

* * * * *